US011100181B2

(12) United States Patent
Bai et al.

(10) Patent No.: US 11,100,181 B2
(45) Date of Patent: *Aug. 24, 2021

(54) PROVIDING CONTINUED SEARCHING AND ASSOCIATED INDICATORS (71) Applicant: International Business Machines Corporation, Armonk, NY (US)

(72) Inventors: Kun Bai, Hartsdale, NY (US); Di Ling Chen, Beijing (CN); Christian Benjamin Kau, Los Altos, CA (US); Zhi Cheng Liu, Waitara (AU); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/380,950

(22) Filed: Apr. 10, 2019

(65) Prior Publication Data
US 2019/0236108 A1  Aug. 1, 2019

Related U.S. Application Data (63) Continuation of application No. 15/078,262, filed on Mar. 23, 2016, now Pat. No. 10,324,990.

(51) Int. Cl.
*G06F 17/30* (2006.01)
*G06F 16/9535* (2019.01)
(Continued)

(52) U.S. Cl.
CPC ........ *G06F 16/9535* (2019.01); *G06F 16/243* (2019.01); *G06F 16/951* (2019.01)

(58) Field of Classification Search
CPC ...... G06F 16/24; G06F 16/156; G06F 16/178; G06F 16/13; G06N 3/00; G06N 5/00; G05B 13/00
See application file for complete search history.

(56) References Cited

U.S. PATENT DOCUMENTS 7,398,271 B1 * 7/2008 Borkovsky ........... G06F 16/951
7,685,191 B1    3/2010 Zwicky et al.
(Continued)

OTHER PUBLICATIONS

"U.S. Appl. No. 15/078,262 Final Office Action", dated Oct. 9, 2018, 13 pages.
(Continued)

*Primary Examiner* — Hung D Le
(74) *Attorney, Agent, or Firm* — Andrew DeLizio; Brian M. Restauro (57) ABSTRACT

A search continuation device and its operations include, for example, performing a first electronic search based on first search criteria. The first electronic search generates first search results. The operations can further include electronically storing search data associated with the first electronic search (e.g., in a user account). The operations can further include performing a second electronic search with second search criteria substantially similar to the first search criteria. The second electronic search generates second search results. The operations can further include, retrieving the search data (e.g., from the user account), and providing, based on the search data, one or more indicators for presentation with the second search results. The one or more indicators specify continued search information, such as a degree to which content contained within an item of the first search results was previously accessed or a difference between the first search results and the second search results.

18 Claims, 6 Drawing Sheets

(51) Int. Cl.
*G06F 16/242* (2019.01)
*G06F 16/951* (2019.01)

(56) References Cited

U.S. PATENT DOCUMENTS

| | | | | |
|---|---|---|---|---|
| 8,224,823 | B1* | 7/2012 | Amacker | G06F 16/9577 |
| | | | | 707/736 |
| 8,819,051 | B2 | 8/2014 | Kraft | |
| 9,015,141 | B2* | 4/2015 | Ravindran | G06F 16/24578 |
| | | | | 707/706 |
| 9,064,016 | B2* | 6/2015 | Shokouhi | G06F 16/9535 |
| 9,760,648 | B2* | 9/2017 | Ravindran | G06F 16/951 |
| 2008/0244428 | A1* | 10/2008 | Fain | G06F 16/3328 |
| | | | | 715/764 |
| 2012/0203757 | A1 | 8/2012 | Ravindran | |
| 2013/0031081 | A1 | 1/2013 | Vijayaraghavan et al. | |
| 2013/0191360 | A1 | | 7/2013 | Burkard et al. | |
| 2015/0193390 | A1* | 7/2015 | Stekkelpak | G06F 16/9558 |
| | | | | 715/207 |
| 2015/0339356 | A1 | 11/2015 | Myslinski | |
| 2015/0379074 | A1 | 12/2015 | Marschner et al. | |
| 2016/0042080 | A1 | 2/2016 | Nguyen | |
| 2016/0117388 | A1 | 4/2016 | Fan | |
| 2017/0053189 | A1* | 2/2017 | Koch | G06F 16/5866 |
| 2017/0235792 | A1* | 8/2017 | Mawji | G06F 16/9536 |
| | | | | 707/769 |
| 2017/0277791 | A1 | 9/2017 | Bai et al. | |

OTHER PUBLICATIONS

"U.S. Appl. No. 15/078,262 Office Action", dated May 31, 2018, 13 pages.

* cited by examiner

PROVIDING CONTINUED SEARCHING AND ASSOCIATED INDICATORS

RELATED MATTERS

This application is a Continuation of and claims the priority benefit of U.S. application Ser. No. 15/078,262 filed Mar. 23, 2016.

BACKGROUND

The descriptive material herein generally relates to the field of electronic searching.

Electronic searching involves using a computer to find a subset of a collection of items based on search criteria. An Internet search typically utilizes a web search engine to search for items on the World Wide Web. The search results are generally presented in a line or listing of items that result from executing a search procedure using search terms (e.g., keywords) provided by a user. The items returned in the results may be a mix of web pages, images, and other types of files. Many web search engines collect information about items by web crawling from site to site and storing, in an index, information about the item (e.g., website titles or names, some page content, headings, metadata in HTML metatags, web addresses, etc.). For instance, a search engine associates words and other definable tokens found on web pages to their domain names and HTML-based fields. The search engine makes and stores associations in a public database, which is made available for web search queries. A query from a user can be a single word or a collection of words. Typically when a user enters a query into a search engine (e.g., one or more keywords entered by the user at the search engine website), the search engine access the index using the keywords.

SUMMARY

A search continuation device and its operations include, for example, performing a first electronic search based on first search criteria. The first electronic search generates first search results. The operations can further include electronically storing search data associated with the first electronic search (e.g., in a user account). The operations can further include performing a second electronic search with second search criteria substantially similar to the first search criteria. The second electronic search generates second search results. The operations can further include, retrieving the search data (e.g., from the user account), and providing, based on the search data, one or more indicators for presentation with the second search results. The one or more indicators specify continued search information, such as a degree to which content contained within an item of the first search results was previously accessed or a difference between the first search results and the second search results.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to web searching, other examples can be associated with other forms of searching, such as computer file searching, commercial database searching, distributed storage system searching, image searching, heuristic searching, and so forth. In other instances, well-known instruction instances, protocols, structures and techniques have not been shown in detail in order not to obfuscate the description.

Typically, when a user initiates a web search using a web search website, the web search website returns a list of many search result items. For example, when a user submits search criteria via the web search website, the web search website returns first search results as a list of links to webpages on the Internet related to the search criteria. A user may read content from some of the links to varying degrees (e.g., some webpages may be opened in the browser for longer periods of time than other webpages, some webpages may be scrolled further, etc.). Others webpages may go unread. Over time the content on some of the webpages may change or be deleted. New content is added. Further, users typically forget what websites they have previously read and to what degree they have read them.

Figure 1:
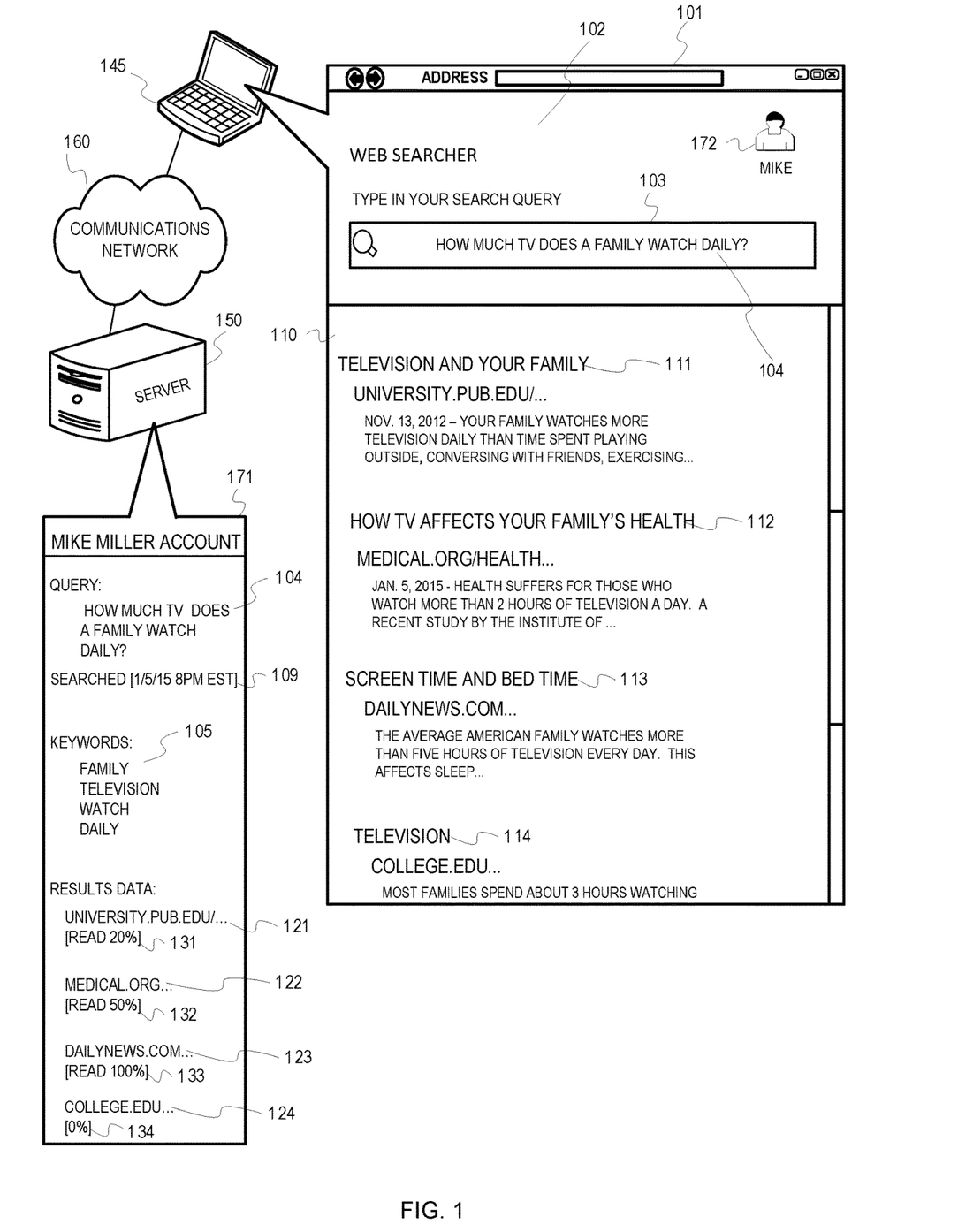
FIG. 1 is an example illustration of performing a web search, analyzing search use activity, and storing data for continued searching.
Figure 2:
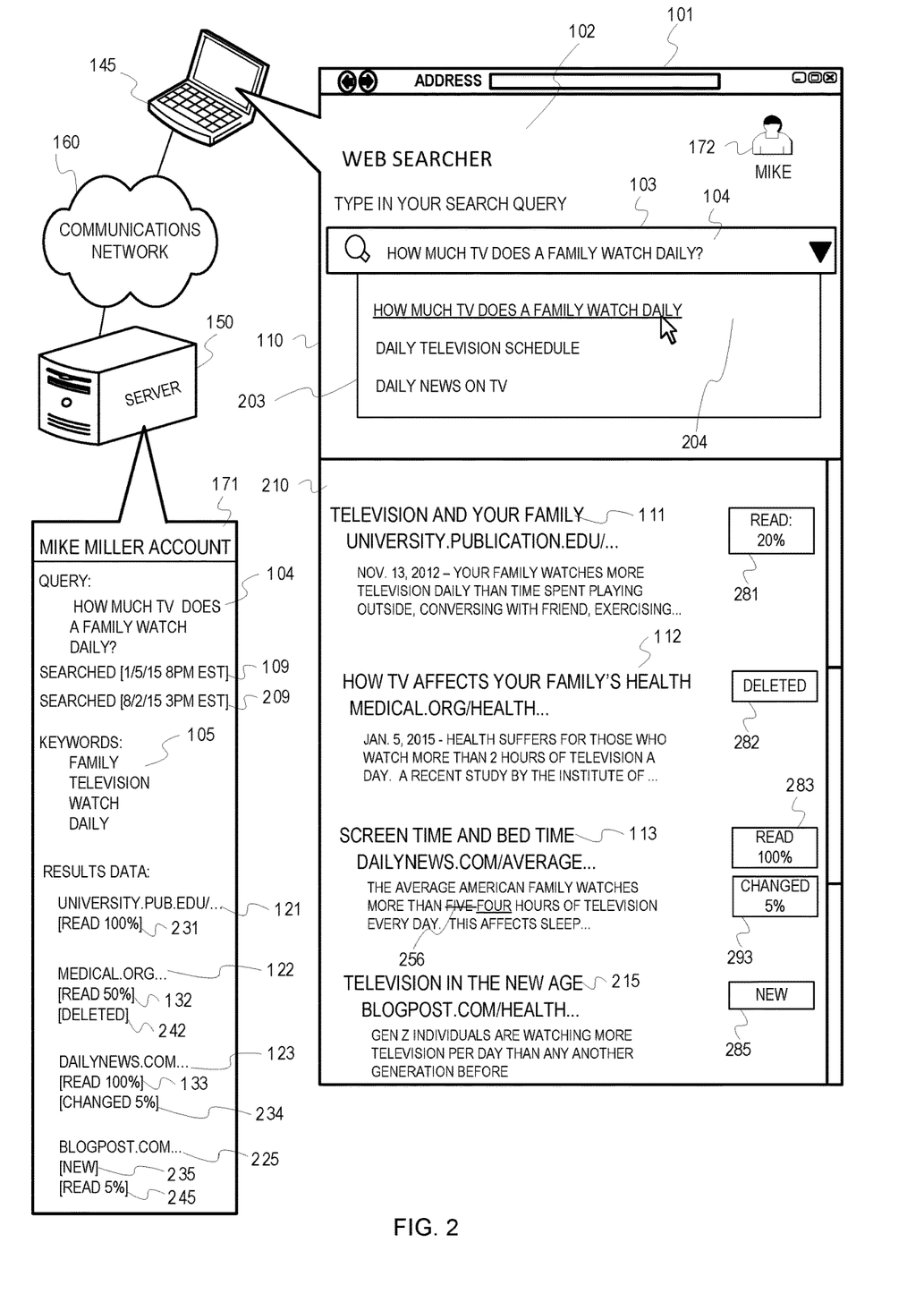
FIG. 2 is an example illustration of performing a continued electronic search, analyzing data from a previous search, and providing continued search information.

If the same search criteria is subsequently submitted in a second search, a web browser currently provides no contextual clues in a listing of second search results regarding to what degree content from the first search results had been previously read, whether any of the second search results are new or missing, whether there had been modifications to content between the time of the first search and the second search, etc. In other words, from the user's perspective, the second search results are new. The user cannot leverage their previous search activity from the first search in the context of their second search on the same search criteria. Consequently, their second search session lacks productivity. FIGS. 1 and 2 below illustrate one example of providing a continued search on substantially similar search criteria. For instance, FIGS. 1 and 2 illustrate options for using search data to analyze items from new and old search results and provide contextual indicators with the second search results to leverage the first search. For instance, the contextual indicators can specify a degree to which content was accessed or used during a first search session, a difference between first and second search results, etc.

FIG. 1 is an example illustration of performing a web search, analyzing search use activity, and storing data for continued searching. In FIG. 1, a computer 145 presents a web browser 101 via a display of a computer 145. The web browser 101 presents a web browser 101 hosted by a server 150. The server 150 is connected to the computer 145 via a communications network 160. The web search website 102 includes a feature by which a user (e.g. Mike Miller) can login to a user account 171. The server 150 can provide, on the web search website 102, an identifier 172 (e.g., an avatar), which signifies that the user account 171 is currently logged into and associated with the web search website 102. Information for the user account 171 can be associated with the server 150 (e.g., stored in a memory storage unit of the server 150, stored in memory storage unit of a user account server accessible to the server 150, stored in a memory storage unit of a third-party device accessible to the server 150, etc.). In other instances, information regarding the user, the search criteria, the electronic search results, etc. may be stored locally on the computer 145, for instance, in a cookie, a local database, etc.

The web search website 102 includes a search query field 103. The search query field 103 is a graphical user interface element in which search criteria can be entered via user input (e.g., by typing on a keyboard, by voice commands, etc.). For example, textual terms are entered into the search query field 103 forming a search query 104 (e.g., "How much TV does a family watch daily?").

Upon detecting user input to submit the search query 104, the computer 145 electronically transmits the search query 104 to the server 150. For instance, the computer 145 transmits a message containing the search query 104 in response to an "Enter" key being pressed on a keyboard or a "submit" button being selected on the web search website 102. The computer 145 submits the message with the search query 104 via the communications network 160 to the server 150. The server 150 receives the message with the search query 104 and initiates a search procedure for a first electronic search. For instance, the server 150 can parse the terms and punctuation in the search query 104, isolating certain keywords 105 (e.g., "family," "television," "watch," "daily"). The server 150 can then execute a subroutine that utilizes a search algorithm to evaluate whether any portion of the keywords 105 are in an index. The index includes data obtained about the websites, such as from a web crawler. The server 150 selects a portion of the websites referenced in the index based on an outcome of the search procedure (e.g., based on first search results generated by use of a search algorithm). The server 150 determines, in response to executing the search procedure, a first listing 110 of links 111, 112, 113, and 114 to the selected portion of the websites, along with other information about the selected portion of the websites (e.g., webpage titles, web addresses, webpage content summaries, etc.).

The server 150 stores information about the search query 104 and the results of the first electronic search for the search query 104. For instance, the server 150 stores in the user account 171 time and/or date information (e.g., timestamp 109) for the electronic search. The server 150 also stores the keywords 105. Further, the server 150 stores identifiers 121, 122, 123, and 124 about the search items from the first search results. The identifiers 121, 122, 123, and 124 may be unique identifiers for the items from the first search results. The identifiers 121, 122, 123, and 124 may include, but are not be limited to, Uniform Resource Identifiers (e.g., Uniform Resource Locator (URL) values, or Uniform Resource Name (URN) values), file names, serial numbers, file path names, Internet Protocol addresses, domain names, tags, fragment values, scheme names, namespaces, host names, user information, port values, query values, Hypertext Markup Language (HTML) values, Extensible Markup Language (XML) values, Extensible Stylesheet Language Transformation (XSLT) values, any combinations of the above, etc.

Furthermore, in FIG. 1, the server 150 determines to what degree content of any accessed item had been read. For instance, the server 150 can determine a degree to which content contained within an accessed item has been accessed (e.g., a degree to which a webpage had been read by the user) based on various analysis techniques and factors various. For example, the server 150 can determine an amount of time a webpage was open based on an implicit or explicit reading rate of a user, a number of times a scrolling activity occurred on the webpage, and so forth. In one example, the server 150 detects that the link 111 is selected. The server 150 also detects a webpage associated with the link 111 is open for a certain amount of time. The server 150 performs analysis using the amount of time the webpage was open, a reading rate for the user, and a number of words within the webpage to determine that approximately 20% of the content on the webpage was read. The server 150 stores, in the user account 171, the data pertaining to the analysis (e.g., the amount of time the page was open, the reading rate, the number of words, the estimated "20%" amount, etc.). For instance, the server 150 stores the estimated "20%" value as an accessed level 131. The server 150 associates the accessed level 131 with the identifier 121 for the link 111.

In a similar fashion, when the link 112 is selected, the server 150 determines to what degree the content for the link 112 was read. For example, the server 150 determines that 50% the content associated with the link 112 was read. The server 150 stores, in the user account 171, the "50%" amount as an accessed level 132. The server 150 associates the accessed level 132 with the identifier 122 for the link 112.

Likewise, when the link 113 is selected, the server 150 determines to what degree the content for the link 113 was read. For example, the server 150 determines that 100% the content associated with the link 113 was read. The server 150 stores, in the user account 171, the "100%" amount as an accessed level 133. The server 150 associates the accessed level 133 with the identifier 123 for the link 113.

The server 150 can also store information on non-accessed links. For instance, link 114 is not accessed. The server 150 stores a value 134 to indicate that the link 114 was not accessed.

FIG. 2 is an example illustration of performing a continued electronic search, analyzing data from a previous search, and providing continued search information. In FIG. 2, a second electronic search is performed after the first electronic search depicted in FIG. 1. For instance, after the server 150 executes the search procedure for the first electronic search, the user associated with the computer 145 may want to perform a second search. The web search website 102 presents the search query field 103 as well as a continued search control 203. The continued search control 203 provides a mechanism by which information about a previous search query can be selected. For instance, if the user account 171 is still logged into (or re-logged into), the server 150 accesses, from the user account 171, information about the first electronic search, such as the search query 104 and/or the keywords 105. The continued search control 203 then presents a previous search indicator 204 that identifies the search query 104, which is selectable by user input. After the previous search indicator 204 is selected, the computer 145 transmits the resubmitted search query 104 to the server 150. The server 150 stores, in the user account 171, a time stamp 209 for when the second electronic search was performed on the search query 104. The server 150 executes the search procedure again on the keywords 105 and returns second search results for the second electronic search as a second listing 210 of links 111, 112, 113, and 215.

The server 150 can determine that some of the links 111, 112, 113 or 215 included in the second search results were also included in the first search results from the first electronic search. For instance, for the second electronic search the server 150 determines, by revaluation of the keywords 105 at the time of the second electronic search, that the links 111 and 113 are in the index maintained by the server 150. The server 150 accesses the data from the user account 171 to determine that links 111 and 113 were also in the first search results. As a result, the server 150 can provide indicators that show that links 111 and 113 were already presented. For instance, the server 150 can adjust a positioning algorithm to place the links 111 and 113 on the first page of the listing 210. In other examples, the server 150 can present graphical indicators, such as special symbols or colors to indicate that the links 111 were included in the first search results, regardless of whether or not they were visited.

Further, the server 150 compares new search results from the second electronic search to the previous search results from the first electronic search and determines differences. For instance, when the server 150 determines the second search results, the server 150 compares the second search results to the data stored in the user account 171. The server 150 determines that a new link 215 was returned in the second search results. The new link 215 is to a new item from the Internet available at the time of the second electronic search (and found in the index at the time of the second electronic search) that was not available at the time of the first electronic search. As a result, the server 150 provides an indicator 285 that specifies that the link 215 is a new result (e.g., a graphic or text that states "New" positioned adjacent to the link 215 within the web browser 101). In another example, the server 150 accesses a stored version of content contained within an item associated with an accessed link at the time of first electronic search ("first version of the content"). The server 150 compares the first version of the content to a second, current version of the content for a returned link at the time of the second electronic search ("second version of content"). The server 150 determines, based on the comparison, whether any of the content has changed in the time between the first electronic search and the second electronic search. For instance, content for a webpage associated with link 113 has changed 5% between the time the first search was performed and the time the second search was performed. Thus, the server 150 provides an indicator 293 to specify the degree of difference. Previous versions of the content may be stored in memory associated with the server 150, in memory of the computer 145, in the user account 171, or in another other locations accessible to the server 150.

Furthermore, the server 150 can present an indicator 256 that highlights a change from a previous version of the content. For instance, some content listed for link 113 shows that the word "five" is crossed out (with a strikethrough text to indicate deletion) and replaced with the word "four" (with underlined text to indicate addition). The word "five" was previously in the content for the link 113 at the time that the first search was performed. At the time of the second search, the content for the link 113 instead had the word "four." Because the server 150 detected that the content had changed from its previous version, the server 150 highlights the difference in the text of the content.

In addition to comparing current content to previous versions of content, the server 150 provides information to assist the user in determining activity and analysis performed at the time of, or shortly after, the first search. The information can indicate, for instance, to what degree of the previous content was read. For example, as described in FIG. 1, the server 150 determined a degree to which web content for each of the links 111, 112, 113 and/or 114 had been read and stored the information in the user account 171. Therefore, at the time of the second electronic search, the server 150 reads from the user account 171 the degree to which the content for each of the links 111, 112, 113, and/or 114 had been read and provides indicators 281 and 283, which show the percentages that the webpages for links 111 and 113 had been previously read.

In addition, the server 150 determines whether any items from the first search results are missing from the second search results. For instance, the server 150 determines, after initiating the search procedure for the second electronic search, that the link 112 was included in the first search results but is not in the second search results. Consequently, the server 150 provides an indicator 282 indicating that the link 112 is no longer available at the web address for the link 112. In some instances, the server 150 can instead provide a cached version of the content for link 112 if the indicator 282 is selected.

Furthermore, the server 150 can store data pertaining to the second electronic search. For instance, the server 150 can store identifiers 121, 122, 123, and 225 for the links 111, 112, 113, and 215 in the user account 171. Furthermore, if any of the active links 111, 113, or 215 are accessed again, the server 150 can determine an additional degree to which the links 111, 113, or 215 are read and store that data in the user account 171. For instance, if the link 111 is accessed again and the server 150 determines that the content for the link 111 was completely read, then the server 150 updates the user account and stores an updated accessed level 231 showing that all of the content was read. The server 150 can store additional data, such as value 242 to indicate that the content associated with the link 112 is no longer available. Further, the server 150 stores content change level 234 to indicate a degree to which the content for link 113 has changed since the time of the first electronic search. The server 150 also stores value 235 in association with identifier 225 to indicate that link 215 is a new link presented for the second search results. The server 150 also determines a degree to which the content for link 215 was accessed and stores accessed level 245.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). Moreover, some embodiments can perform more or less than all the operations shown in any flow diagram.

Figure 3:
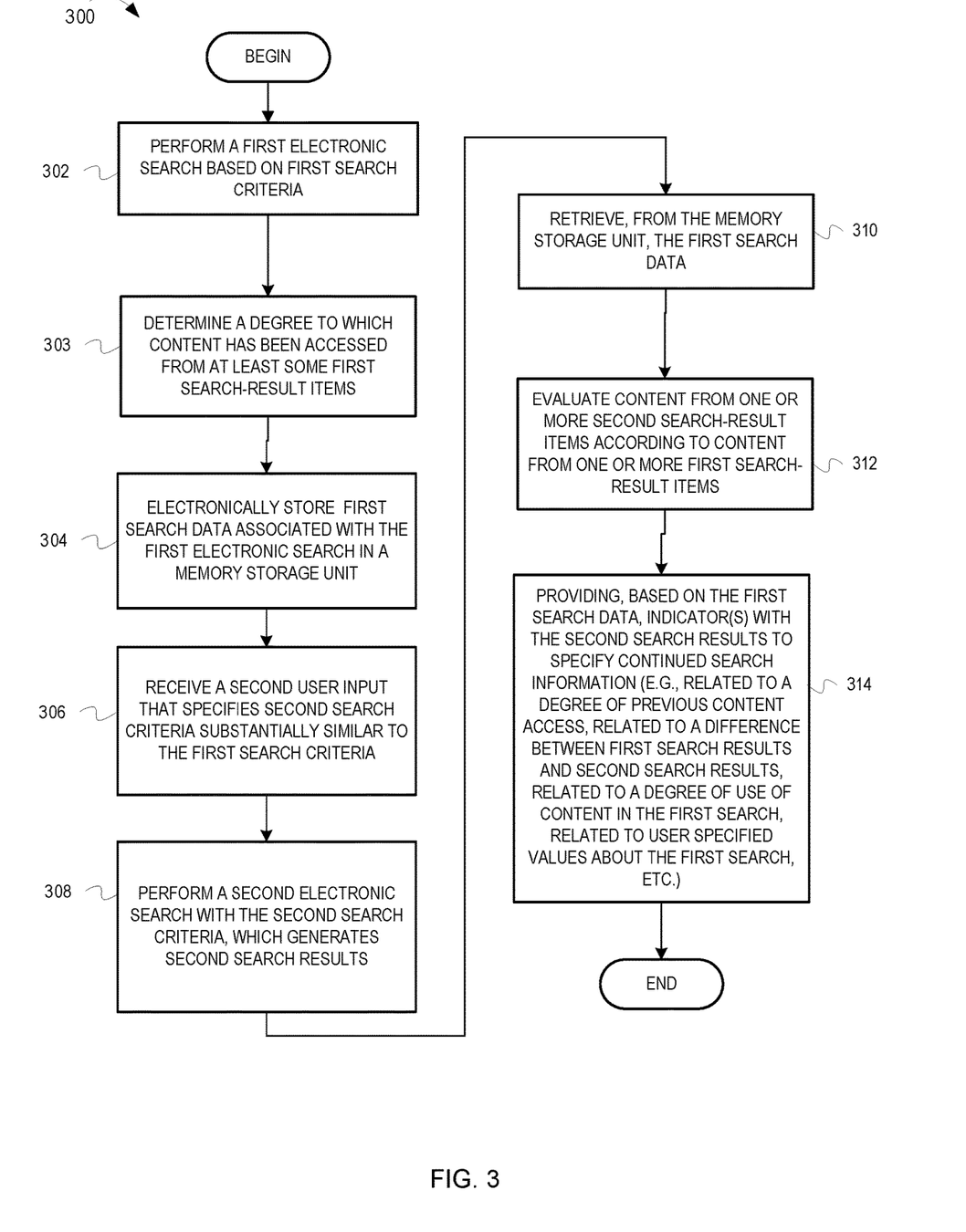
FIG. 3 is an example flow diagram 300 illustrating performing a continued search and providing continued search indicators.

FIG. 3 is an example flow diagram ("flow") 300 illustrating performing a continued search and providing continued search indicators. The description associated with FIG. 3 may refer momentarily to the examples of FIGS. 1 and 2.

In FIG. 3, the flow 300 begins at processing block 302, where an electronic device configured to provide continued search features ("search continuation device") performs a first electronic search ("first search") based on first search criteria. In some instances, the search continuation device is a server (e.g., the server 150 of FIGS. 1 and 2) a computer (e.g., the computer system of FIG. 5), a mobile device, a combination of devices, etc. In some embodiments, the search continuation device is configured to determine first user input that specifies first search criteria for the first search. The search continuation device conducts a first search procedure for the first search criteria. For instance, the search continuation device parses search query terms provided via the user interface and determines keywords. The search continuation device executes a search procedure associated with a search engine using the keywords. The search continuation device initiates a search through an index of information associated with each item in a group that is electronically searchable. An item may include any electronically analyzable member from a set of distinct, electronically searchable objects, such as, but not limited to, content on the Internet (e.g., web pages, images, movies, articles, files, etc.), index entries in a search index (e.g., web document references, document titles, filenames, etc.), computer files stored on a computer-readable storage medium, records stored in a database, elements in a search space defined by a mathematical formula or procedure (e.g., roots of an equation with integer variables), solutions from a virtual space used in a constraint satisfaction problem, a substructure of a given discrete structure (e.g., a graph, a string, a finite, group, etc.), storage devices in a storage area network (e.g., disk arrays, tape libraries, optical jukeboxes, etc.), and so forth. Each searchable item has specific properties and/or characteristics that distinguish the item to make it unique from any other searchable objects. For instance, each item may have a unique identifier (e.g., a unique network address, a serial number, a catalog number, etc.). Properties and characteristics can be combined to form a unique identifier (e.g., a unique combination of file name and network path). In some examples, for an online search, the item may be a webpage or link to a webpage (e.g., a reference to a webpage stored in an index), which has a unique Uniform Resource Locator (URL). Each item includes more detailed data that is electronically searchable and which may be distinct from content of other items (e.g., web-page content, URL data, title tags, image file names, meta-descriptions, etc.).

The search continuation device, via the search procedure, determines which of the items from the group are applicable to the search query terms. For instance, the search continuation device compares the keywords from the search terms to textual descriptions of elements and/or characteristics of the items (e.g., title, abstract, summary, content, metadata, etc.). Based on a number of similarities between the keywords and the search terms, according to a search algorithm, the search continuation device determines which of the items should be included in the search results, and, in some instances, determines a ranked order for the listing of items. The listing of items may include an item itself, a copy of the item, a representation of the item, references to the item, portions of the item, elements of the item, etc.

The flow 300 continues at processing block 303, where the search continuation device determines a degree to which content is accessed from at least some first search-result items. For example, the search continuation device can determine a percentage of content, contained within an item of the first search results, which is read, listened to, viewed, played, completed, filled in, copied, modified, etc.

The search continuation device can determine the degree to which the content is accessed in various ways. For instance, the search continuation device can apply the following equation:

$$\text{percentage of content accessed} = 100 \times ((\text{amount of use of content for an item}) \times (\text{a use rate}))/(\text{a total amount of the content contained within the item}). \quad \text{Equation 1:}$$

In some examples, the use rate can be explicitly or implicitly determined. For instance, if the use rate is a reading rate, the reading rate can be explicitly determined based on a user-specified value (e.g., entered by the user). In another example, a reading rate can be explicitly determined based on a reading test presented to the user. In other instances, a reading rate can be implicitly determined, for instance by using an average reading rate (words/time) of persons with similar age, education, or other demographic characteristics as the user. In one example, if a webpage that contains a news article is open for 1 minute, and a user reading rate is 60 words per minute, and the webpage includes 300 total words, then the values can be entered into a version of equation 1 as follows: percentage of words read on a webpage=100×((amount of time webpage was open)×(a reading rate for a user))/(the total number of words on the webpage)=100×((1 minute)×(60 words/minute))/(300 words)=20% of words read. Consequently, the search continuation device determines that approximately 20% of the webpage was accessed. The search continuation device can store the value of 20% for future reference if the webpage is included in results from a subsequent search.

In some instances, the use rate is a rate at which specific content within the item is presented or played. For example, if the content is a song or video, and the song or video plays within a web browser at a given playing rate, then the playing rate can be used as the use rate. For instance, a music player on a webpage may play a song for 20 seconds before the music player is stopped, or before the webpage is closed. The music player is configured to play the song at a tempo of 100 beats per minute (based on metadata associated with the song). Further, the song is 300 beats long. The search continuation device can enter those values into a version of equation 1 as follows: percentage of song played on a webpage=100×((amount of play of the song)×(the playing tempo of the music player for the song))/(the length of the song)=100×((20 seconds)×((100 beats/minute)×(1 minute/60 seconds))/(300 beats in the song)=11.11% of the song played. Consequently, the search continuation device determines that approximately 11% of the song was accessed. The search continuation device can store the value of 11% for future reference if the webpage is included in results of a subsequent search or if another webpage presenting the song occurs in results of a subsequent search.

In another example, the search continuation device can compute an estimated percentage of content that was accessed according to an amount of time spent scrolling or an amount of pages scrolled, such as according the following formula:

$$\text{percentage of content read} = (\text{a number of pages scrolled down on an item})/(\text{a total number of scrollable pages of the item}). \quad \text{Equation 2:}$$

For example, after a first web search, if one of the links included in the search results is selected, a web browser presents a webpage associated with the link. The web browser presents the webpage according to a resolution setting of a display and/or according to font and zoom settings of the web browser. Based on the settings, the web browser may present the webpage with ten scrollable pages. The search continuation device can determine, for instance, that the user scrolls through two out of the ten pages. Therefore, no more than 20% of the page could have been visible on a display, and so the search continuation device estimates that 20% of the content was read.

In other examples, the search continuation device uses a combination of techniques. For example, if the user scrolls down to the second page (out of 10 pages), but the webpage is immediately closed or navigated away from thereafter, then the search continuation device may estimate that the second page could not have been read. Therefore, the search continuation device estimates that 10% of the content was read.

In other instances, the search continuation device analyzes the content to determine whether there are certain types of content. For instance, the search continuation device can determine that a webpage includes both text and graphics. In some instances, during the computation of the percentage of content read, the search continuation device may detect that a particular page of a document has many graphics versus text. Thus, the search continuation device may adjust the reading rate for the user to be higher for that given page to compensate for the reduced amount of text on the page.

The flow 300 continues at processing block 304, where the search continuation device electronically stores first search data associated with the first electronic search in a memory storage unit associated with the search continuation device. For example, the search continuation device stores in a memory storage unit search result links, content, metadata, degree of content access, etc. The memory storage unit can be connected to one or more of the computer (e.g., a cookie, a file, a local database, etc.), a secondary device (e.g., a thumb drive, a peripheral disk drive, a mobile device, etc.), a user account (e.g., via user account credentials), etc. The first search data includes, but is not limited to, one or more of the following: keywords from the first search; a search time; first search results; content from items of the first search results; identifiers of the items; metadata; information about whether, and to what degree, content of an item was accessed; an indication of what content was displayed or presented; an amount of time an item was displayed; a number of pages in an item; an amount of scrolling; user credentials; user identifiers; indications of user activity (e.g., navigation activity, submission activity, playing activity, purchase activity, etc.), and so forth. In some instances, the search continuation device can detect whether a user input is entered to specify whether to save some or all of the search data. For instance, the search continuation device can present one or more options for a user to specify which data to save (e.g., an option to save a web search, an option to save analysis regarding an amount of data accessed or read, etc.).

The flow 300 continues at processing block 306, where the search continuation device receives a second user input that specifies second search criteria substantially similar to the first search criteria. For example, the search continuation device detects that a search string is entered into a search field. The search continuation device can then compare the search string to determine if it is equivalent to (e.g., has equal or nearly identical keywords as) a previously saved search, such as the keywords from the first search. In another example, the search continuation device detects that a previously saved search string is selected from one or more saved searches. For example, the search continuation device can provide a dropdown option to select saved groupings of keywords from previous searches (e.g., in FIG. 2 the indicator 204 that identifies the search query 104 may be in a dropdown menu having only saved searches). In another example, the search continuation device may present suggested searches based on words typed into a search field. For instance, as text is typed into a search field, the search continuation device presents a dropdown menu that specifies suggestions for possible combinations of keywords. As each word is typed, the search continuation device continuously checks whether the combination of words typed are similar to a previously saved combination of words from a previous search. In some instances, after a certain number of the words are typed into the search field, the search continuation device may present previous saved searches related to one or more specific keywords. For instance, after "How much TV" is typed into the search field, the search continuation device determines that the second search will be related to the keyword "TV." The search continuation device thus presents saved search queries related to TV (e.g., the search continuation device presents a selectable option that specifies the search query "How much TV does a family watch daily?" that was saved previously).

The flow 300 continues at processing block 308, where the search continuation device performs a second electronic search ("second search") with the second search criteria, which generates second search results. The search continuation device may perform the second search similar to first search. For instance, the search continuation device may execute the same search procedure, using the same search algorithm, as from the first search. However, because some time has passed between the first search and the second search, the search index may have changed based on changes to searchable items. Therefore, the second search results may be different from the first search results.

The flow 300 continues at processing block 310, where the search continuation device retrieves, from the memory storage unit, the first search data. For instance, the search continuation device retrieves from the first search data information about which items from the first search results were accessed and to what degree they were accessed, similar to the description in FIG. 2.

Figure 4:
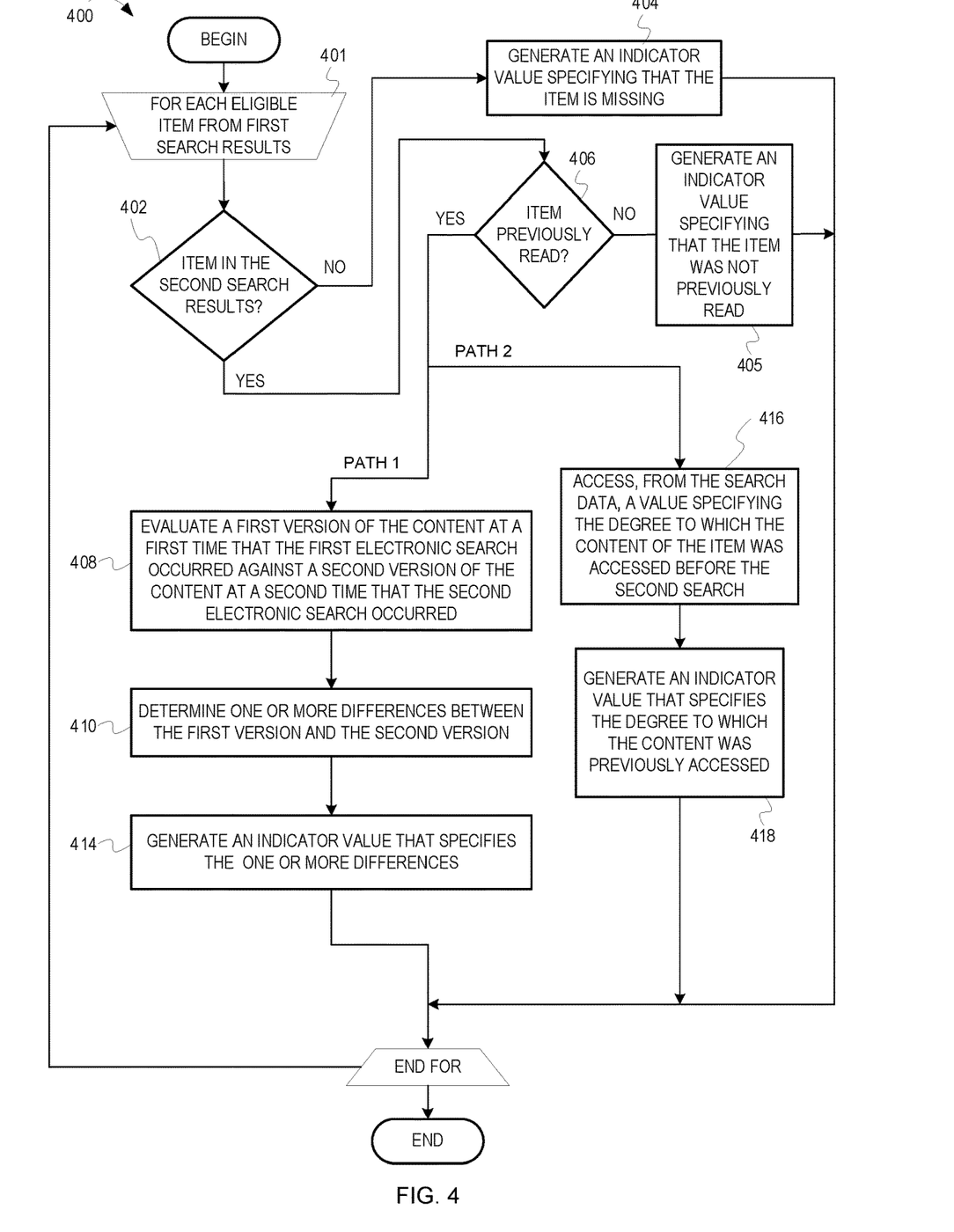
FIG. 4 is an example flow diagram 400 illustrating analyzing content and determining indicator values for a continued search.

The flow 300 continues at processing block 312, where the search continuation device evaluates content from one or more second search-result items according to content from one or more first search-result items. For instance, the search continuation device determines that at least one of the items from the second search results was also included in the first search results. For example, one of the items from the second search results may have an exact network address and name (e.g., the same URL and webpage title) as an item from the first search results. If the search continuation device detects a matching item, the search continuation device can select the item for evaluation. In some instances, the search continuation device filters the matches before selecting any of the matches for evaluation. For instance, the search continuation device can select only items that were read or accessed from the first search results. In another example, the search continuation device may select whether to evaluate a matched item only if the matched item has a sufficiently high ranking in the second search results (e.g., the search continuation device only evaluates items if they appear on a first page of results). In one example, to evaluate the content of matched items, the search continuation device can determine a numerical value that describes a characteristic of a previous version of the content, such as a number or order of words in the content. In some instances, the numerical value is more than merely a value that specifies whether an item was opened, but includes a degree of access (e.g., use) of the content contained within the item. For example, the numerical value can be an analytical outcome of previously accessed content, such as a degree to which the content that was previously read. The search continuation device can compare a value from an updated version of the content to a version of the content that was previously accessed. FIG. 4 (described in more detail further below) illustrates an example of a search continuation device that evaluates content from one or more second search-result items according to content from one or more first search-result items.

The flow 300 continues at processing block 314, where the search continuation device provides one or more indicators to specify continued search information. The one or more indicators may specify a degree of previous content access or a difference between the first search results and the second search results.

An example of an indicator includes, but is not limited to text, a graphic, a pop-up, a specific color, a font type, a font characteristic, a specific size of object, a specific symbol, a light or sound effect, a number, a position on a page, etc. In some instances, as described in FIG. 2, an indicator may specify whether an item is new, is missing or deleted, or has been changed from a previous version. The indicator may also specify a degree to which an item has changed. The indicator may also specify a degree to which content of an item had been previously accessed.

In some instances, the indicator specifies whether an item in the second search fails to meet certain criteria or thresholds. For instance, an item in the first search may have been read but marked (e.g., selected, rated, ranked, tagged, etc.) by user input as being below a specific level of value. If so, then if the same item appears in the second search, that item may be positioned lower in a listing for the second search results. In other instances, that item may be marked by a specific visual indicator to specify the level or degree of significance.

In some instances, the search continuation device may vary the characteristic of the indicators proportional to a numerical value associated with analysis of an item. For example, if a first item had been read 100%, then a first indicator for that item may be smaller or less prominent than a second indicator for a second item that had been read to a lesser degree, or vice versa. The indicator may further specify a numerical value on the indicator (e.g., a percentage). In an example where there is a change between versions of content, the indicator can include color or font highlighting within the body of the changed content (e.g., yellow highlighting on words that were added or changed in the content).

Furthermore, in addition to providing indicators, the search continuation device can also save second search data associated with the second search, such as second search results, a time the second search was performed, changes to the content, an updated degree of access, etc.

Furthermore, in some examples, the search continuation device can refer to user settings or preferences. For instance, the search continuation device can detect whether a user selects an option to display one or more of the indicators. In some instances the user settings can specify customized indicators (e.g., with custom graphics, with specific accessibility features, etc.).

FIG. 4 is an example flow diagram ("flow") 400 illustrating analyzing content and determining indicator values for a continued search. In FIG. 4, the flow 400 begins at processing block 401 where a search continuation device determines at least a portion of items from the first search results to evaluate. In some instances only some of the items from the first search results are selected, such as only a specific number of the top hits from the first search (e.g., only links from a first page of the first search results) or only a specific number of items manually selected by the user.

The flow 400 continues at processing block 402, where a search continuation device determines whether an item from first search results is in the second search results. If the instant item is not in the second search results, then the flow 400 continues to block 404 where the search continuation device generates an indicator value specifying that the item is not in the second search results. If the item from the first search results is in the second search results, the process continues at block 406 where the search continuation device determines whether the item was previously read. If the item was not previously read, then the search continuation device can avoid having to evaluate the item. In some example instances, the decision associated with processing block 406 may be included in the eligibility criteria at processing block 401. If, at processing block 406, the eligible item had not previously been read, the search continuation device can, at processing block 405, generate an indicator value specifying that item had not previously been read (e.g., a link's font has a specific color showing that the item was previously presented but not accessed). If, however, at processing block 406, the eligible item had previously been read, then the flow 400 branches into two parallel paths, Path 1 and Path 2, which start respectively at block 408 and block 416. This description will first describe Path 1.

The flow 400 continues at processing block 408, where the search continuation device evaluates a first version of content for the item at a first time that the first search occurred against a second version of content for the item at a second time that the second search occurred. For instance, the search continuation device can access the previous version of the content from one of various locations, such as, but not limited to, a user account, a versioning database, a cookie, etc. The search continuation device can access the current version of the content by pre-loading content from the second search into a buffer. The search continuation device then performs a comparison between the two versions. The search continuation device can utilize a diff function (e.g., longest common subsequence function, longest increasing subsequence function, rolling hash function, etc.). The search continuation device can also compare metadata (e.g., XML, tags, image descriptions, etc.). The search continuation device can also change the format of data before evaluating the content, such as by performing a text recognition function on an item to determine the identity of characters within the content. In some instances, the search continuation device performs the comparison before the item returned by the second search is accessed by a user. For instance, while performing the second search procedure the search continuation device can perform the comparison. However, in other examples the search continuation device can perform the comparison only after a user selects an item from the second search results (e.g., after detecting that a webpage link is clicked on from a listing of links that show the second search results). At that moment, the search continuation device may retrieve the current content of the web page and compare the most current version of the content with the previously saved version of the content.

The flow 400 continues at processing block 410, where the search continuation device determines one or more differences between the first version and the second version. For example, the search continuation device may detect whether text within the content has changed, whether image names or properties have changed, whether data has been moved or rearranged, whether data sources for the content are different, etc.

In some instances, the search continuation device determines a degree of change that the one or more differences represent. For example, the search continuation device can determine whether a certain percentage of the content has changed in wording, positioning, numbering, imagery, formatting, metadata, etc. In some instances, the search continuation device determines a type of change that the one or more differences represent. For example, the search continuation device can determine whether actual words have changed to new words (i.e., wording changes) versus whether only font properties or punctuation have changed.

The flow 400 continues at processing block 414, where the search continuation device generates an indicator that specifies the one or more differences. For instance, the search continuation device can generate one or more indicators that specify a degree of change and/or type of change to the content. The search continuation device can generate a graphic to present with the second results in connection with a reference to the item, as similarly shown in FIG. 2 for indicator 293. For instance, the search continuation device can position a graphic that indicates the degree or type of change adjacent to, superimposed over, embedded into, etc. the content or a link to the content. In some instances, the search continuation device can also determine which of the types or amounts of changes would be relevant to a user and generate the indicator for only the relevant changes. For instance, if a change to the content was to wording within a certain portion of the content (e.g., content between the "<body></body>" Hypertext Markup Language (HTML) elements of a webpage), the search continuation device can determine that the changed content is highly relevant. However, if change to the content was merely to text formatting, to positioning, to punctuation, or the like, the search continuation device may determine that the changed content is less relevant.

Referring now to the Path 2, which begins at processing block 416, the search continuation device determines a degree to which content of the item was read before the second search. For example, the search continuation device reads data stored in a user account regarding a percentage that the content was read before the second search was performed.

The flow 400 continues at processing block 418, where the search continuation device generates an indicator value that specifies the degree to which the content was previously accessed. For instance, the search continuation device generates a graphic that shows a percentage of content that was read, as similarly shown in FIG. 2 for indicators 281 and 283.

In some embodiments, the operations can be performed in series, while in other embodiments, one or more of the operations can be performed in parallel, such as Path 1 and Path 2 of flow 400 that flow from processing block 406.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
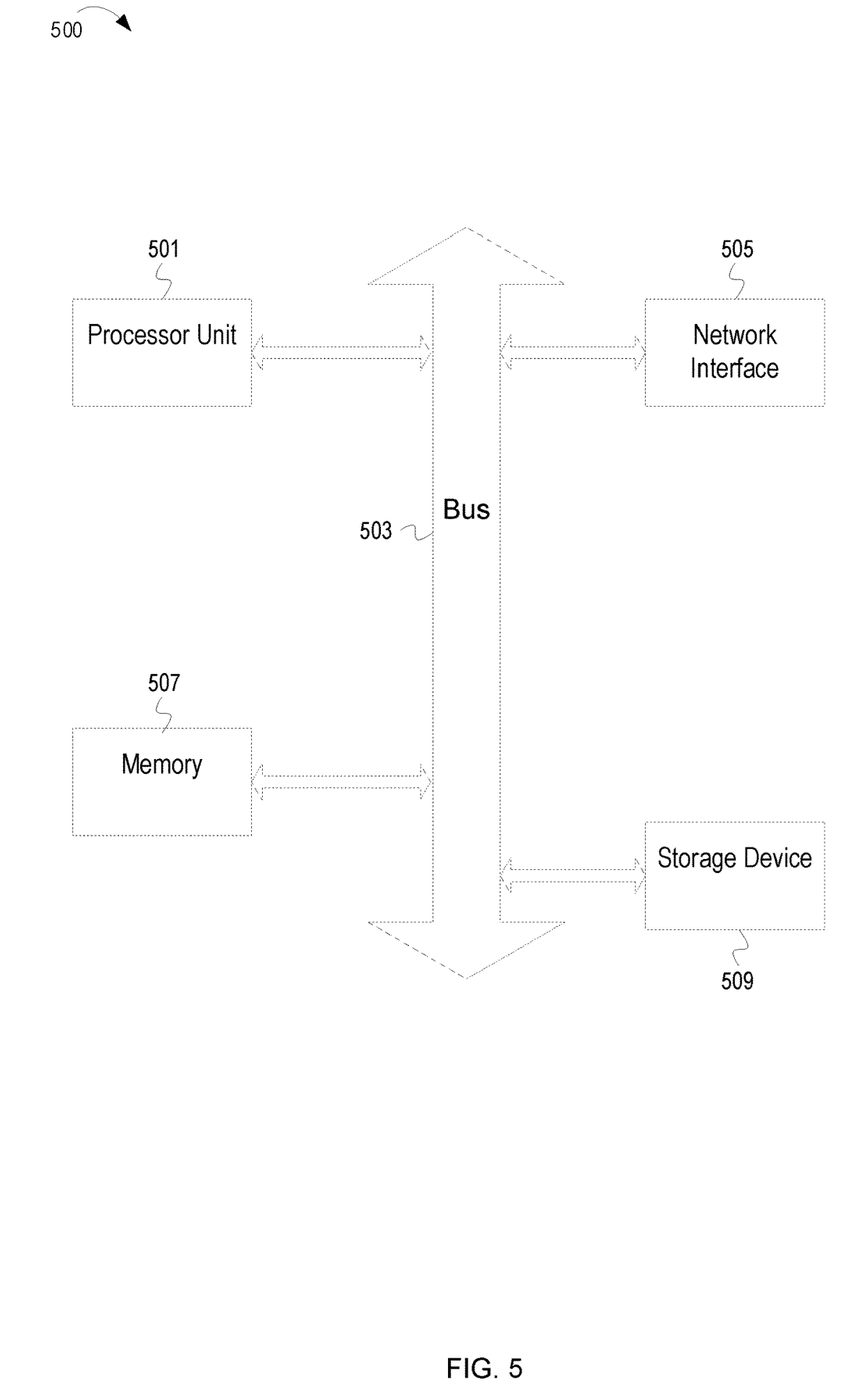
FIG. 5 is an example illustration of an example computer system.

FIG. 5 is an example illustration of a computer system 500. The computer system 500 includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include one or more functionalities that facilitate a continued search as described above. Any one of the continued search functionalities may be partially (or entirely) implemented in hardware and/or on the processing unit 501. For example, the continued search functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501. Some, or all, portions of the computer system 500 may comprise a continued search device.

Figure 6:
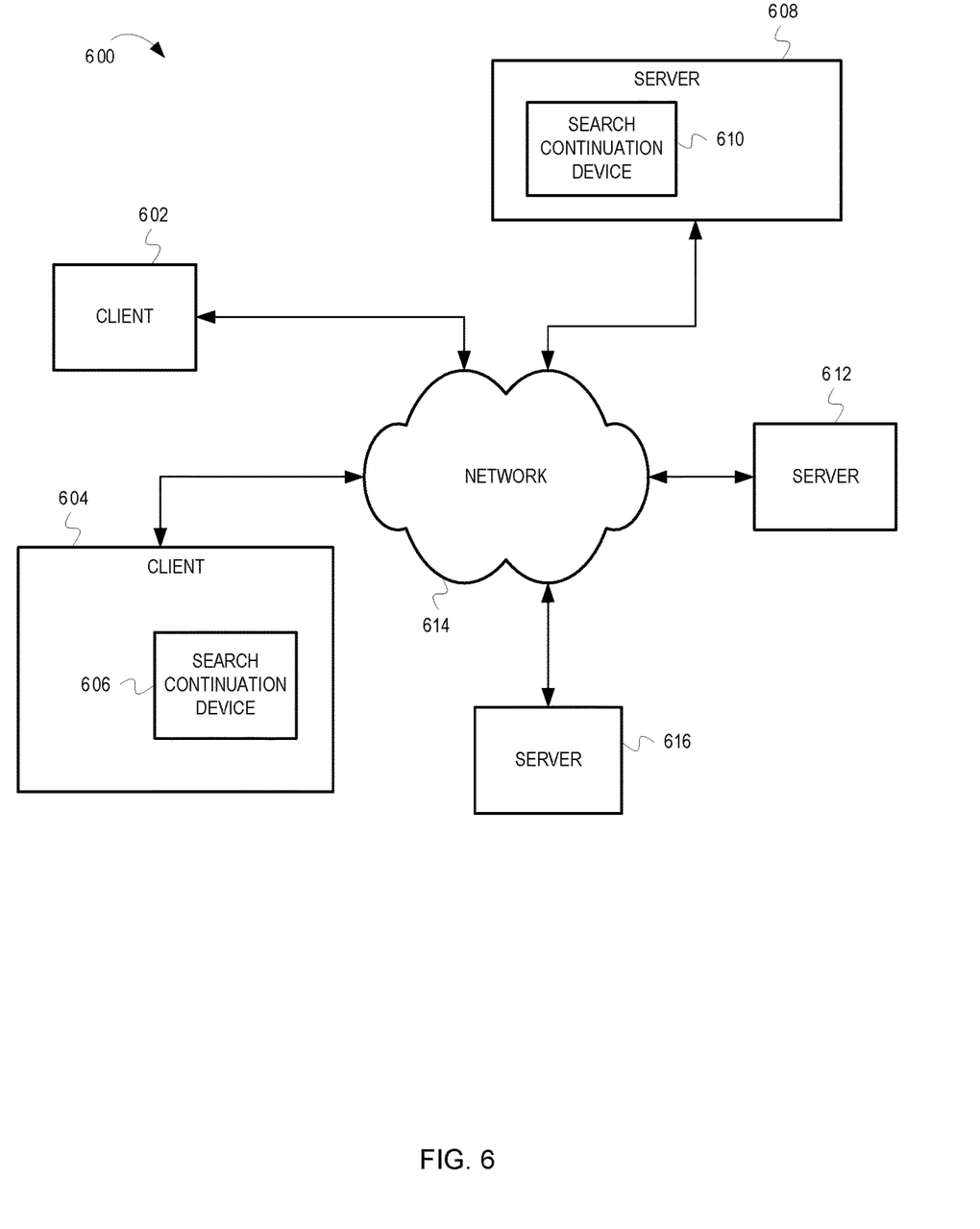
FIG. 6 is an example illustration of a networking environment.

FIG. 6 is a block diagram illustrating a networking environment 600, according to some embodiments of the invention. The networking environment 600 can include multiple client devices ("clients") 602 and 604 connected to multiple servers 608, 612 and 616 via a network 614. The network 614 can be a local area network (LAN), a wide area network (WAN), a telephone network, such as the Public Switched Telephone Network (PSTN), an intranet, the Internet, or a combination of networks. For simplicity, the networking environment 600 shows only two clients 602 and 604 and three servers 608, 612, and 616 connected to the network 614. A search continuation device (e.g., search continuation device 606 and/or search continuation device 610) may be embodied in one or more client machines, possibly including one or more of the clients 602 and 604 or in a server, such as the server 608. According to some embodiments the search continuation device (one or more of search continuation device 606 and/or search continuation device 610) determines search criteria (e.g., search terms for a search query), executes an electronic search (e.g., using the search criteria), provides search results, stores search data, stores user data, logs in user accounts, analyzes search results, compares search results from a previous search and a continued search, provides continued search indicators related to the search results and analysis, and so forth. In practice, there may be a different number of clients and servers. In addition, in some instances, a client may perform the functions of a server and a server may perform the functions of a client. Any one of the clients 602, 604 and servers 608, 612, and 616 can be embodied as the computer system described in FIG. 5. The clients 602 and 604 can be mainframes, minicomputers, personal computers, laptops, personal digital assistants, or the like. Additionally, the clients 602 and 604 may be capable of connecting to the network 614. The clients 602 and 604 may transmit data over the network 614 or receive data from the network 614 via a wired, wireless, optical, or other connection.

While the embodiments are described with reference to various implementations and exploitations, it will be understood that these embodiments are illustrative and that the scope of the inventive subject matter is not limited to them. In general, techniques for continued searching as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of providing a continued search comprising:
performing, via an electronic processing unit of an electronic device, a first electronic search based on first search criteria, wherein the performing the first electronic search generates first search results;
electronically storing, in a memory storage unit, search data associated with the first electronic search;
detecting, via the electronic processing unit, a selection of an item from the first search results;
analyzing, via the electronic processing unit, a use of content contained within the item comprising:
determining, via the electronic processing unit, an amount of time that the content was displayed on an electronic display of the electronic device;

multiplying, via the electronic processing unit, the amount of time by a reading rate associated with a user for the electronic device to produce a product; and dividing, via the electronic processing unit, the product by a number of words in the content;

performing, via the electronic processing unit, a second electronic search with second search criteria substantially similar to the first search criteria, wherein the performing the second electronic search generates second search results;

retrieving, from the memory storage unit, the search data; and providing, via the electronic processing unit based on the search data, one or more indicators for presentation with the second search results, wherein the one or more indicators specify a difference between the first search results and the second search results.

2. The method of claim 1 further comprising:

determining a degree to which the content was accessed based on the analyzing the use of the content, wherein the providing the one or more indicators with the second search results comprises providing an indicator that specifies the degree to which the content was previously accessed.

3. The method of claim 1, wherein the analyzing the use of the content comprises:

determining an amount of scrolling of the content; and dividing the amount of scrolling by a number of scrollable pages of the content.

4. The method of claim 1 further comprising:

evaluating first content from a first item included in the first search results against second content from a second item included in the second search results, wherein the first content is stored in the search data; and determining a difference between the first content and the second content based on the evaluating, wherein the difference between the first search results and the second search results comprises the difference between the first content and the second content.

5. The method of claim 4, wherein the providing the one or more indicators comprises presenting a visual indicator associated with a link to the second content, wherein the visual indicator indicates a numerical value for the difference.

6. The method of claim 4, wherein the providing the one or more indicators comprises presenting a visual indicator that specifies whether the second content was included in the first search results.

7. The method of claim 4, wherein the providing the one or more indicators comprises presenting a graphical indicator that specifies whether the first content is missing from the second search results.

8. The method of claim 1 further comprising:

logging in a user account;

storing the search data in the user account, wherein the search data includes an indication of the first search criteria; and providing an option to select the indication of the first search criteria as the second search criteria.

9. A computer program product for electronically searching, the computer program product comprising:

one or more computer readable storage media; and program instructions stored on the one or more computer readable storage media, the program instructions comprising:

program instructions to perform, via an electronic processing unit of an electronic device, a first electronic search based on first search criteria, wherein the performing the first electronic search generates first search results;

program instructions to electronically store, in a memory storage unit, search data associated with the first electronic search;

program instructions to detect, via the electronic processing unit, a selection of an item from the first search results;

program instructions to analyze, via the electronic processing unit, a use of content contained within the item comprising program instructions to:

determine, via the electronic processing unit, an amount of time that the content was displayed on an electronic display of the electronic device;

multiply, via the electronic processing unit, the amount of time by a reading rate associated with a user for the electronic device to produce a product; and divide, via the electronic processing unit, the product by a number of words in the content;

program instructions to perform, via the electronic processing unit, a second electronic search with second search criteria substantially similar to the first search criteria, wherein the second electronic search generates second search results;

program instructions to retrieve, from the memory storage unit, the search data; and program instructions to provide, via the electronic processing unit based on the search data, one or more indicators for presentation with the second search results, wherein the one or more indicators specify a difference between the first search results and the second search results.

10. The computer program product of claim 9, further comprising program instructions stored on the one or more computer readable storage media, to:

determine the degree to which the content was accessed based on the analyzing the use of the content.

11. The computer program product of claim 9, wherein the program instructions to analyze the use of the content contained within the item comprises program instructions to:

determine an amount of scrolling of the content; and divide the amount of scrolling by a number of scrollable pages of the first item.

12. The computer program product of claim 9, further comprising program instructions stored on the one or more computer readable storage media, to:

log in the user account before performing the first electronic search;

store second data in the user account, wherein the second data includes an indication of the first search criteria;

after storing the second data and before performing the second electronic search, access the second data from the user account;

provide a user interface element for presentation, wherein the user interface element indicates one or more keywords from the first search criteria;

detect a selection of the one or more keywords from the user interface element; and use the one or more keywords as the second search criteria.

13. A computer system comprising:

one or more computer processors;

one or more computer readable storage media; and program instructions stored on the one or more computer readable storage media for execution by at least one of the one or more computer processors, the program instructions comprising:

program instructions to perform a first electronic search based on first search criteria, wherein the performing the first electronic search generates first search results;

program instructions to electronically store first search results associated with the first electronic search;

program instructions to detect a selection of an item from the first search results;

program instructions to analyze a use of content contained within the item comprising program instructions to:

determine an amount of time that the content was displayed on an electronic display of the electronic device;

multiply the amount of time by a reading rate associated with a user for the electronic device to produce a product; and divide the product by a number of words in the content;

program instructions to perform a second electronic search with second search criteria substantially similar to the first search criteria, wherein the performing the second electronic search generates second search results;

program instructions to retrieve search data; and program instructions to provide one or more indicators for presentation with the second search results, wherein the one or more indicators specify a difference between the first search results and the second search results.

14. The computer system of claim 13, further comprising program instructions stored on the one or more computer readable storage media for execution by at least one of the one or more computer processors, to:

log in a user account;

store a first set of keywords in the user account in response to a first user input;

before a second user input is determined, present, within a graphical user interface, an indication of the first set of keywords;

detect a selection of the first set of keywords; and use, as the second set of keywords, the first set of keywords.

15. The computer system of claim 13, further comprising program instructions stored on the one or more computer readable storage media for execution by at least one of the one or more computer processors, to:

determine that an item having a unique identifier is included in both the first search results and the second search results;

generate a listing of the second search results, wherein the listing includes a selectable link to the item;

determine one or more differences between a first version of content contained within the item and a second version of the content contained within the item, wherein the first version of the content is from a first copy of the item stored at a time before the second user input is determined and the second version of the content if from a second copy of the item accessed at a time after the second user input is determined; and provide a visual indicator of the one or more differences, wherein the visual indicator is associated with the selectable link to the item within the listing.

16. The computer system of claim 15, wherein the visual indicator specifies a percentage of changes between the first version of the content and the second version of the content.

17. The computer system of claim 13, wherein the program instructions to provide one or more indicators for presentation with the second search results based on evaluation of the second search results and the first search results, comprise:

program instructions to perform operations to present a visual indicator that specifies whether one or more items from the second search results were included in the first search results.

18. The computer system of claim 13, wherein the program instructions to provide one or more indicators for presentation with the second search results based on evaluation of the second search results and the first search results, comprise:

program instructions to present a visual indicator that specifies whether one or more items from the first search results are missing from the second search results.

* * * * *